United States Patent [19]

Callahan, Jr.

[11] Patent Number: 4,642,638

[45] Date of Patent: Feb. 10, 1987

[54] APPARATUS FOR GENERATING ENHANCED/REGENERATIVE BRACKET DECODE SIGNALS

[75] Inventor: Patrick O. Callahan, Jr., Lusby, Md.

[73] Assignee: The United States of America as represented by the Secretary of the Navy, Washington, D.C.

[21] Appl. No.: 507,658

[22] Filed: Jun. 27, 1983

[51] Int. Cl.⁴ .............................................. G01S 13/75
[52] U.S. Cl. ......................................... 342/45; 342/40
[58] Field of Search .......... 343/6.5 R, 6.5 LC, 6.8 R, 343/6.8 LC

[56] References Cited

U.S. PATENT DOCUMENTS

| | | | |
|---|---|---|---|
| 3,667,054 | 5/1972 | Nelson | 343/6.5 LC X |
| 3,732,563 | 5/1973 | Nelson | 343/6.5 LC |
| 3,940,764 | 2/1976 | Beeswing | 343/6.5 LC |
| 4,003,050 | 1/1977 | Miller | 343/6.5 LC X |
| 4,008,471 | 2/1977 | Hall et al. | 343/6.5 LC |
| 4,314,247 | 2/1982 | Elberink et al. | 343/6.5 LC |
| 4,486,752 | 12/1984 | Chihak | 343/6.8 LC X |

Primary Examiner—T. H. Tubbesing
Assistant Examiner—John B. Sotomayor
Attorney, Agent, or Firm—Kenneth E. Walden; John G. Wynn

[57] ABSTRACT

An improved bracket decoder apparatus including an enhanced bracket decoder portion and a regenerative bracket decoder portion operates to generate enhanced bracket decode signals and regenerative bracket decode signals. The foregoing combination of decoder portions will allow digital display systems which use IFF information to detect all targets that are replying regardless of the IFF train spacing, even overlapping replies. The enhanced bracket decoder portion of the apparatus can be operated alone to detect all reply conditions except the one of overlapping replies. The apparatus is configured to provide presently used signals also, i.e., the bracket decode, the degarbled bracket decode, and the range and code information for each video reply.

7 Claims, 2 Drawing Figures

APPARATUS FOR GENERATING ENHANCED/REGENERATIVE BRACKET DECODE SIGNALS

BACKGROUND OF THE INVENTION

1. Field of the Invention

The present invention relates to Identification Friend or Foe (IFF) systems, but more specifically, it relates to novel types of bracket decoders for use with IFF systems.

2. Description of the Prior Art

Identification Friend or Foe (IFF) has long been a vital factor in tactical operations. IFF has progressed from the recognition of coats of arms and flags to the present day electronic systems. Todays IFF systems comprise interrogator subsystems and transponder subsystems. The interrogator subsystem asks the question of all unknown entities, "Who are you?". A transponder subsystem answers this question. Most present day Navy ships use one interrogator subsystem for each radar system. Some present day Navy ships use up to five or more interrogator subsystems.

Information sent from the interrogator subsystems is fed to various types of processsors and decoders, whose purposes, inter alia, are (1) to establish and declare targets, based on incoming video replies, and (2) to determine the correct range, and sometimes code, of the target in question for the mode interrogated.

At the present time, if more than one reply is present in some 40.60 or 60.90 μsec window size, the processor may not recognize any targets. Some processors may recognize only the first and last targets, with all other targets being dropped regardless of window size if the reply spacing is inappropriate.

Consequently, there is a need in the prior art to be able to handle mutiple target situations so as to accurately pick out the proper number of targets when multiple replies are located at certain inappropriate spacings for existing systems.

The prior art as indicated hereinabove include some important advances in IFF systems. However, insofar as can be determined, no prior art IFF system incorporates all of the features and advantages of the present invention.

OBJECTS OF THE INVENTION

Accordingly, a principal object of the present invention is to detect the proper number of targets notwithstanding the spacings of multiple replies.

Another important object of present invention is to determine the proper range of the detected targets.

Yet another important object of the present invention is to determine the correct IFF code in a multiple reply situation, when possible, and to identify when the IFF code has been incorrectly determined.

SUMMARY OF THE INVENTION

In accordance with the above stated objects, the present invention has as a primary purpose to allow digital display systems which use IFF information to detect all targets that are replying regardless of the IFF train spacing. A corollary purpose is to detect the proper IFF range and IFF code and to identify potentially garbled codes.

The essence of the present invention is in generating an enhanced bracket decode signal and a regenerative bracket decode signal to be used in place of or in addition to the presently used degarbled bracket decode and bracket decode signals.

The purpose of the present invention is carried out by generating in a conventional manner, bracket decodes, the "kill junction", and degarbled bracket decodes from IFF composite video, and by using the bracket decode and "kill junction" signal to generate the enhanced bracket decode by a first one shot multivibrator which will inhibit any other enhanced bracket decodes during its opeation because its inverted output is connected to the enhanced bracket decode AND gate. The non inverted output of the first multivibrator is delayed by the first delay device by a predetermined delay and passed to a second one shot multivibrator, whose output is the enhanced bracket decode. The IFF code and IFF range are latched by the last bracket decode occurring before the enhanced bracket decode, delayed by the third delay device. The regenerative bracket decode is generated by determining when an enhanced bracket decode should have occurred based on reply video spacings, but did not occur. The regenerative bracket decode signal also identifies that the IFF code, which was latched (at the last bracket decode delayed by the third delay device) is potentially garbled. Additionally, the regenerative bracket decode is generated by delaying the signal from the first one shot multivibrator by a second delay device by a predetermined delay and then allowing any bracket decode without a degarbled bracket decode but occurring during the predetermined delay to start another operating period of the third one shot multivibrator. The inverted output of the third one shot multivibrator clocks a flip flop logic device. The data input of the aforementioned flip flop logic device is the inverted output from a fourth one shot multivibrator which is started by the enhanced bracket decode signal. The enhanced bracket decode signal also clears the aforementioned flip flop logic device whose output is passed to a fifth one shot multivibrator. The output of this one shot multivibrator is the regenerative bracket decode signal.

BRIEF DESCRIPTION OF THE DRAWINGS

The foregoing other objects, novel features and advantages of the present invention will be more apparent from the following more particular description of a preferred embodiment as illustrated in the accompanying drawings, in which.

DESCRIPTION OF THE PREFERRED EMBODIMENT

Figure 1:
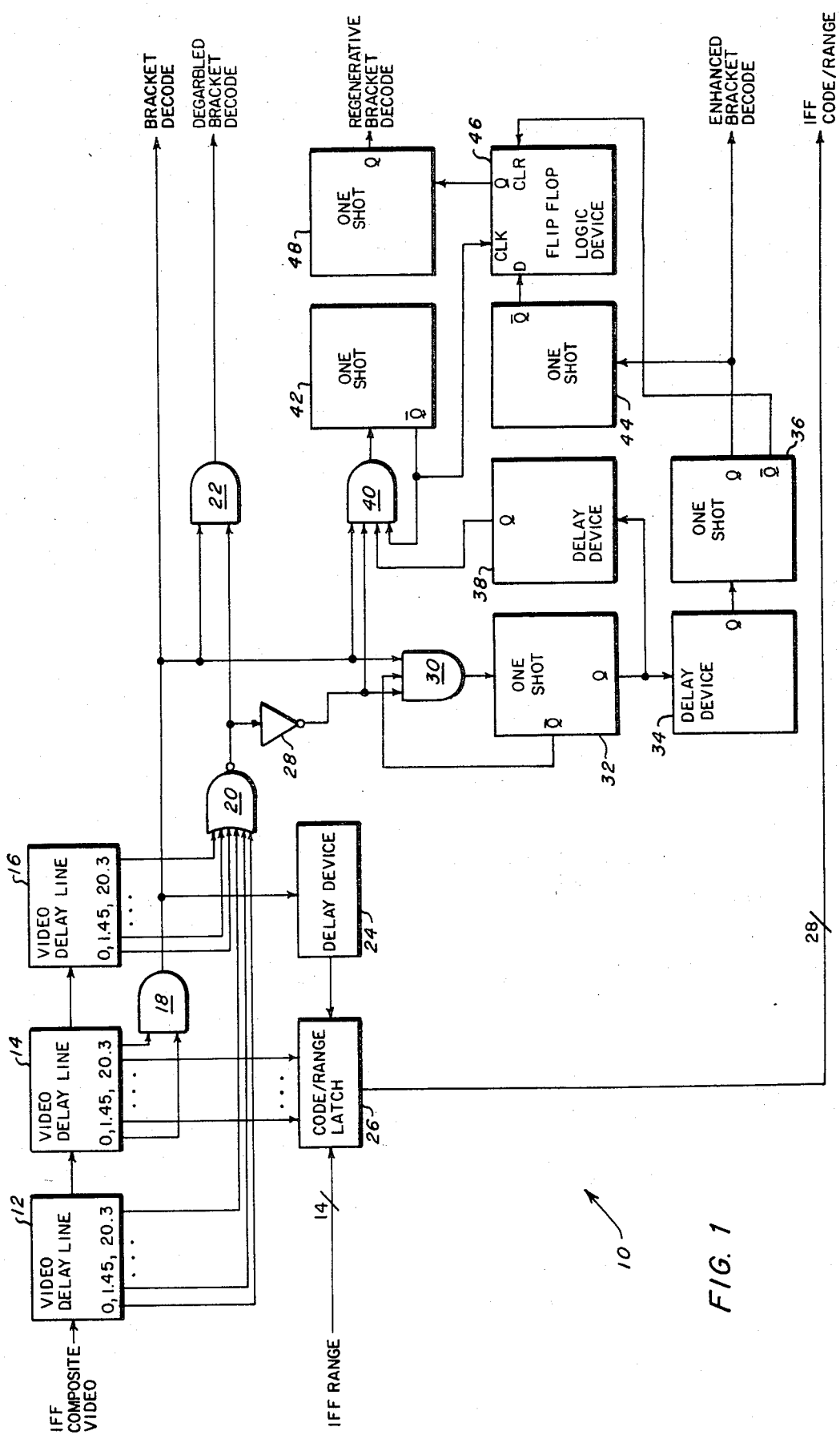
FIG. 1 is a block diagram representation of an enhanced/regenerative bracket decoder, according to the present invention, depicting, inter alia, the relationship of an enhanced bracket decoder portion and a regenerative bracket decoder portion to the presently used degarbled bracket decoder and bracket decoders.

FIG. 1 shows an embodiment of an enhanced/regenerative bracket decoder 10 in which the present invention is employed to generate enhanced bracket decodes and regenerative bracket decodes which allow detection of multiple targets regardless of the reply spacings thereof. Fundamentally, the enhanced/regenerative decoder 10 comprises a video delay line 12 which is fed by an IFF composite video signal at its input. The video delay line 12 outputs a delayed IFF composite video to another video delay line 14 which outputs an additionally delayed IFF composite video to yet another video delay line 16. Video delay lines 12 and 16 also output code information at multiples of predetermined IFF pulse spacing to a degarbled bracket decode NOR gate 20. A bracket decode AND gate 18 is fed by two taps having predetermined delay spacings from the video delay line 14. The output signal from the bracket decode AND gate 18 is, therefore, the bracket decode signal. The output of the bracket decode AND gate 18 also feeds a degarbled bracket decode AND gate 22. The output of the degarbled bracket decode NOR gate 20 also feeds the aforementioned AND gate 22. The junction at the output of the degarbled bracket decode NOR gate 20 is called the "kill junction" and the signal thereat, the "kill junction" signal. Thus, the degarbled bracket decode AND gate 22 ANDs two signals at its input to produce the degarbled bracket decode signal.

To continue, the bracket decode AND gate 18 also outputs a signal to delay device 24 which delays the signal from the bracket decode AND gate 18 and latches the code information from the video delay line 14 and externally available range information in a code/range latch 26 for use by other portions of the IFF systems (not shown). An inverter 28 inverts the "kill junction" signal from the degarbled bracket decode NOR gate 20. The output of the inverter 28 is operatively connected to an enhanced bracket decode AND gate 30 and a regenerative bracket decode AND gate 40. The aforementioned AND gates 30 and 40 are fed by the inverting outputs of a one shot multivibrator 32 and another one shot multivibrator 42, respectively. In turn, the outputs of the AND gates 30 and 40 feed the inputs of one shot multivibrator 32 and one shot multivibrator 42, respectively, making them non-retriggerable. The enhanced bracket decode AND gate 30 and the regenerative bracket decode AND gate 40 are also driven by the output of the bracket decode AND gate 18. The regenerative bracket decode AND gate 40 is also driven by the output of the one shot multivibrator 32 after it is delayed a predetermined amount by a delay device 38. The output of one shot multivibrator 32 also drives the input of another delay device 34 which delays the signal from the one shot multivibrator 32 and passes it to a one shot multivibrator 36. This multivibrator detects the edge of the aforementioned signal and outputs it as the enhanced bracket decode signal. The enhanced bracket decode output of the one shot multivibrator 36 also feeds a one shot multivibrator 44. The inverted output of the one shot multivibrator 36 feeds the clear input of a flip flop logic device 46. The output of the one shot multivibrator 42 additionally is connected to the clock input of the flip flop logic device 46. The output of the one shot multivibrator 44 feeds the data input of the aforementioned flip flop logic device 46. The output of the flip flop logic device 46 drives the input of a one shot multivibrator 48 which edge detects its input and outputs the regenerative bracket decode signal.

STATEMENT OF THE OPERATION

Figure 2:
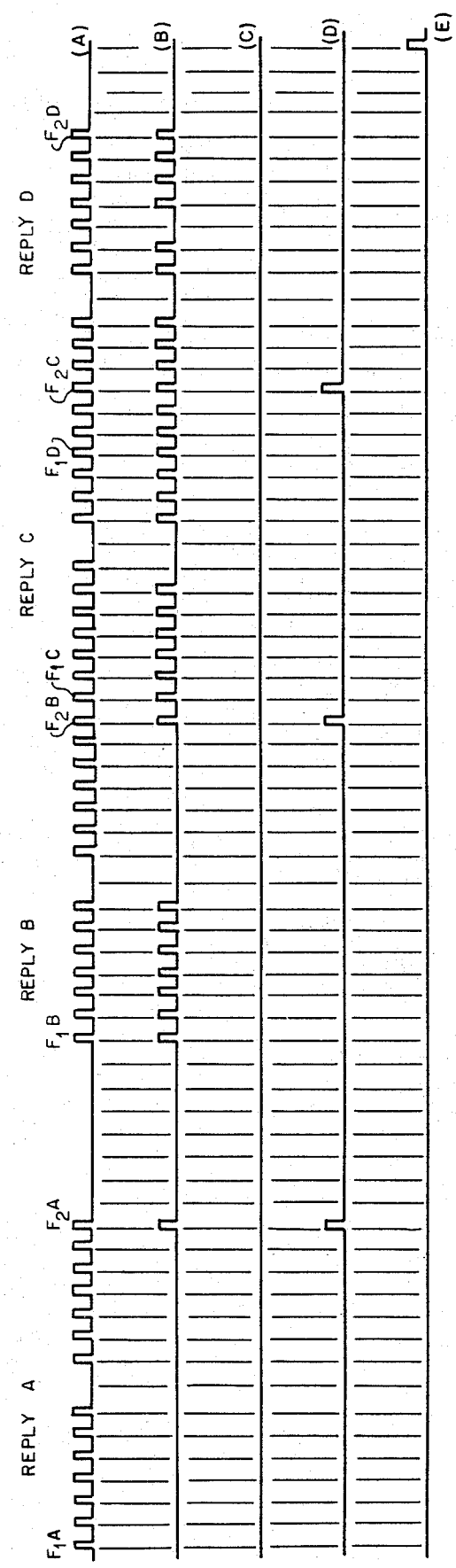
FIG. 2 is a timing diagram representation of replies of multiple targets showing the degarbled bracket decode, the bracket decode, the enhanced bracket decode, and the regenerative bracket decode signals as generated by the enhanced/regenerative bracket decoder of FIG. 1.

Details of the operation, according to the present invention, are now described in conjunction with the block diagram of FIG. 1 and the timing diagram if FIG. 2 as viewed concurrently.

IFF composite video in the form of replies as depicted in FIG. 2(A). The waveforms, i.e., decodes, of FIGS. 2(B)–2(E) are all actually delayed by the 20.3 $\mu$secs required for the IFF composite video to pass through the video delay 12. The bracket decode signals of FIG. 2(B) are generated by logically ANDing, in the bracket decode AND gate 18, the two signals separated at the 20.3 $\mu$sec spaced taps of the video delay line 14. On the timing diagram of FIG. 2, the spacing markings grids are at 1.45 $\mu$sec intervals. To continue, the degarbled bracket decode signal of FIG. (C) (no pulses shown for the reply conditions depicted) is generated by ANDing the output of the bracket decode AND gate 18, 2(B) with the output of the degarbled bracket decode NOR gate 20. The output signal of the degarbled bracket decode NOR gate 20 is at a logical downlevel during the occurrence of each bracket decode due to other video trains and the delayed video outputs of the video delay lines 12 and 16 being spaced within 20.3 $\mu$secs of each other. The function of these two delay lines is to inhibit the degarbled bracket decodes if video replies are present before or after the desired reply. The delay device 24 and the code/range latch 26 cooperate to latch the IFF range information (fourteen line bus) and the code from the video delay line 14 so as to make it available as IFF code/range information (twenty eight line bus) for subsequent use.

Still referring to FIGS. 1 and 2 as viewed concurrently. The enhanced bracket decode signals of FIG. 2(D) are generated by the coaction of the enhanced bracket decode AND gate 30 and the one shot multivibrator 32 in a 20.95 $\mu$sec non-retriggerable configuration. The delay device 34 allows the enhanced bracket decode signal to be delayed by 0.20 $\mu$sec so that the code/range information from the code/range latch 26 can be validated when used in conjunction with the enhanced and regenerative bracket decode signals. The one shot multivibrator 36, which operates at 0.45 $\mu$sec (the normal pulse width of bracket decodes) detects the edge of the delayed signal from the delay device 34 and generates the proper pulse width for the enhanced bracket decode signals. (The 20.95 $\mu$sec timing is required because of the 20.3±0.10 $\mu$sec framing pulse spacing, and the 0.45±0.10 $\mu$sec pulse width). It should be noted that the one shot 32 and the AND gate 30 combination is started by a bracket decode FIG. 2(B) with no corresponding degarbled bracket decode, FIG. 2(C), if no other bracket decode has occurred in the preceeding 20.95 $\mu$secs prior to the start of a bracket decode. This is the condition shown in FIG. 2.

The regenerative bracket decode signal of FIG. 2(E) is generated, as determined, inter alia, by the inputs to the regenerative bracket decode AND gate 40, when a bracket decode occurs in the absence of a degarbled bracket decode signal, and, the one shot multivibrator 32 has been active longer than 1.0 $\mu$sec (the delay time of the delay device 38) and no regenerative bracket decode has commenced within the preceeding 20.95 $\mu$secs as ultimately determined by the output of the one shot multivibrator 42 driving the clock input of the flip flop logic device 46. If an enhanced bracket decode signal has not occurred by the end of the pulse from the one shot multivibrator 42, a regenerative bracket decode signal will be generated by the coaction of the one shot multivibrator 44, the flip flop logic device 46, and the one shot multibrator 48. For purposes of the present invention, the one shot multivibrator 44 can be a 21.95

μsec device, the one shot multivibrator 48 can be a 0.45 μsec device having rising edge triggering.

Referring now specifically to the timing diagram of FIG. 2, the reply A between the points F₁A and F₂A, the reply B between the points F₁B and F₂B and the reply C between the points F₁C and F₂C in FIG. 2(A), generate only enhanced bracket decodes, FIG. 2(D), as these replies are not overlapping. As shown, reply A is slightly separated from reply B and reply B is exactly adjacent to reply C. On the other hand, reply C and reply D are over lapped, and, accordingly, no enhanced bracket decodes FIG. 2(D) are generated but a regenerative bracket decode is generated, FIG. 2(E). Thus, for the four reply conditions depicted, thirty one (31) bracket decodes were generated, no degarbled bracket decodes were generated, and the enhanced and regenerative bracket decodes number four (4), the same as the number of replies.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. An apparatus for generating enhanced and regenerative bracket decode signals from IFF composite video, and for detecting the proper number of replies from the IFF composite video regardless of their spacings, comprising:
   a first video delay line for receiving and delaying the IFF composite video a predetermined amount;
   a second video delay line operatively connected at its input to said first video delay line for additionally delaying the delayed IFF composite video the same predetermined amount;
   a third video delay line operatively connected at its input to said second video delay line for still additionally delaying the twice delayed IFF composite video still the same predetermined amount;
   a bracket decode AND gate operatively connected at its input to two taps of said second video delay line, the two taps having predetermined delay spacings such that the output of said bracket decode AND gate is a bracket decode signal;
   a degarbled bracket decode NOR gate operatively connected at its input to predetermined taps of said first and third video delay lines for generating a "kill junction" signal at its output from the code information at its input;
   a degarbled bracket decode AND gate operatively connected at its input to the output of said bracket decode AND gate and said degarbled bracket decode NOR gate for ANDing the bracket decode signal and the "kill junction" signal at its input to product a degarbled bracket decode signal;
   an inverter operatively connected to the output of said degarbled bracket decode NOR gate for inverting the "kill junction" signal thereat;
   enhanced bracket decode means operatively connected at its input to the output of said inverter and said bracket decode AND gate for generating an enhanced bracket decode signal from the inverted "kill junction" signal and the bracket decode signal; and
   regenerative bracket decode means operatively connected at its input to the output of said inverter, said bracket decode AND gate and said enhanced bracket decode means for generating a regenerative bracket decode signal.

2. The apparatus of claim 1 wherein said enhanced bracket decode means comprises:
   an enhanced bracket decode AND gate operatively connected at its input to the output of said inverter and said bracket decode AND gate;
   a first one shot multivibrator operatively connected at its input to the output of said enhanced bracket decode AND gate and at its inverting output back to the input of said enhanced bracket decode AND gate so as to make said first one shot multivibrator non-retriggerable;
   a first delay device operatively connected at its input to the non-inverting output of said first one shot multivibrator so as to allow the enhanced bracket decode signal to be delayed by a predetermined amount so that code/range information can be validated when used in conjunction with the enhanced and regnerative bracket decode signals; and
   a second one shot multivibrator operatively connected at its input to the output of said first delay device for detecting the edge of the delayed signal therefrom so as to generate the enhanced bracket decode signal at the non-inverting output of said second one shot multivibrator.

3. The apparatus of claim 2 wherein said regenerative bracket decode means comprises:
   a second delay device operative connected to the non-inverting out of said first one shot multivibrator for delaying the signal therefrom a predetermined amount;
   a regenerative bracket decode AND gate operatively connected at its input to the output of said inverter, said bracket decode AND gate and said second delay device;
   a third one shot multivibrator operatively connected at its input to the output of said regenerative bracket decode AND gate and at its inverting output back to the input of said regenerative bracket decode AND gate so as to make said third one shot multivibrator non-retriggerable;
   a fourth one shot multivibrator operatively connected at its input to the non-inverting output of said second one shot multivibrator;
   a flip flop logic device operatively connected at its clear input to the non-inverting output of said second one shot multivibrator, at its data input to the inverting output of said fourth one shot multivibrator, and at its clock input to the non-inverting input of said third one shot multivibrator; and
   a fifth one shot multivibrator operatively connected at its input to the non-inverting output of said flip flop logic device, said fifth one shot multivibrator being configured to edge detect the signal at its input so as to generate the regenerative bracket decode signal at its non-inverting output.

4. The apparatus of claim 3 further comprising:
   a third delay device operatively connected at its input to the output of said bracket decode AND gate for delaying the bracket decode signal therefrom; and
   a code/range latch operatively connected at one input to the output of said third delay device, at another input to code information from a predetermined number of taps of said second video delay line, at still another input to a source of IFF range information so as to latch the IFF range information and the code information to make it available as IFF/code range information.

5. The apparatus of claim 4 wherein the predetermined amount, the same predetermined amount, and the still the same predetermined amount of delay for said first, second, and third video delay lines, respectively, is about 21.75 μsec.

6. The apparatus of claim 5 wherein the predetermined delay spacings of the taps driving said bracket decode AND gate is about 20.3 μsec.

7. The apparatus of claim 6 wherein the pulse width of the pulses at the outputs of said first and third one shot multivibrators is about 20.95 μsec.

* * * * *